(12) United States Patent
Vanfossen et al.

(10) Patent No.: US 10,611,270 B2
(45) Date of Patent: Apr. 7, 2020

(54) ADJUSTMENT SYSTEM FOR AN OCCUPANT SUPPORT

(71) Applicant: Faurecia Automotive Seating, LLC, Auburn Hills, MI (US)

(72) Inventors: Tristan J. Vanfossen, Belmont, MI (US); James J. Farber, Holland, MI (US); James T. Hotary, Auburn Hills, MI (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 0 days.

(21) Appl. No.: 16/139,196

(22) Filed: Sep. 24, 2018

(65) Prior Publication Data

US 2019/0100117 A1 Apr. 4, 2019

Related U.S. Application Data

(60) Provisional application No. 62/565,399, filed on Sep. 29, 2017.

(51) Int. Cl.
*B60N 2/02* (2006.01)
*B60N 2/18* (2006.01)
*B60N 2/62* (2006.01)
*B60N 2/00* (2006.01)

(52) U.S. Cl.
CPC .......... *B60N 2/0284* (2013.01); *B60N 2/002* (2013.01); *B60N 2/0244* (2013.01); *B60N 2/62* (2013.01); *B60N 2002/0268* (2013.01)

(58) Field of Classification Search
CPC .... B60N 2/002; B60N 2/0244; B60N 2/0284; B60N 2/62
USPC ............................................. 297/284.11, 410
See application file for complete search history.

(56) References Cited

U.S. PATENT DOCUMENTS

| | | | |
|---|---|---|---|
| 7,798,570 B2 * | 9/2010 | Kwiecinski | B60N 2/888 297/410 X |
| 9,499,072 B2 * | 11/2016 | Yetukuri | B60N 2/0284 |
| 10,011,193 B2 | 7/2018 | Yetukuri | |
| 2004/0160107 A1 * | 8/2004 | Steinle | B60N 2/835 297/410 |
| 2015/0231991 A1 * | 8/2015 | Yetukuri | B60N 2/0284 297/284.11 |
| 2017/0158088 A1 * | 6/2017 | Pike | B60N 2/646 |
| 2019/0202328 A1 * | 7/2019 | Engelke | A47C 7/14 |

* cited by examiner

*Primary Examiner* — Rodney B White
(74) *Attorney, Agent, or Firm* — Barnes & Thornburg LLP

(57) ABSTRACT

An occupant-support base includes a seat pad and a pad-extension system. The seat pad includes a fixed portion and a movable portion that is configured to move relative to the fixed portion. The pad-extension system is configured to move the movable portion to fit occupants of different sizes.

18 Claims, 4 Drawing Sheets

ADJUSTMENT SYSTEM FOR AN OCCUPANT SUPPORT

PRIORITY CLAIM

This application claims priority under 35 U.S.C. § 119(e) to U.S. Provisional Application Ser. No. 62/565,399, filed Sep. 29, 2017, which is expressly incorporated by reference herein.

BACKGROUND

The present disclosure relates to an occupant support, and particularly to a vehicle seat. More particularly, the present disclosure relates to a vehicle seat having movable portions.

SUMMARY

According to the present disclosure, an occupant-support base includes a seat pad and a pad-extension system. The seat pad includes a generally fixed portion and a movable portion that is configured to move relative to the fixed portion. The pad-extension system is configured to move the movable portion relative to the fixed portion to fit occupants of different sizes.

In illustrative embodiments, the occupant-support base further includes an extension-control system coupled to the seat pad. The extension-control system is configured to adjust automatically the occupant-support base to accommodate occupants of different sizes and maximize comfort for the different occupants. The extension-control system includes a sensor unit arranged coupled to the seat pad and configured to send sensor signals associated with an occupant seated thereon and a controller configured to receive the sensor signals, compare the sensor signals, and send a command signal to the pad extension system to cause the movable portion of the seat pad to extend or retract.

In illustrative embodiments, the sensor unit includes a plurality of sensors that are configured to send a sensor signal to the controller. The sensor signals are associated with a value. The values are representative of a pressure distribution or a proximity of the occupant relative to each sensor. The sensor array may include capacitive sensors, resistive sensors, optical sensors, combinations thereof, or any other device suitable in determining the position of the occupant relative to the occupant-support base.

In illustrative embodiments, the controller is configured to compare each value sent by the sensor unit to one another to determine if adjustment of the occupant-support base is needed. The controller is configured to calculate ratios based on the value of adjacent sensors. The ratios indicate whether the occupant-support base should be adjusted to accommodate an occupant of a different size.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a perspective and diagrammatic view, in accordance with the present disclosure, showing an occupant-support base including a seat pad, a pad-extension system, and an extension-control system having a sensor unit coupled to the seat pad and configured to sense a position of an occupant seated on the seat pad as suggested in FIGS. 2 and 3;

FIGS. 2 and 3 are perspective and diagrammatic views of the occupant-support base of FIG. 1 with occupants of different sizes seated thereon and showing that the pad-extension system and the extension-control system cooperate to adjust automatically a movable portion of the seat pad between an extended configuration, as shown in FIG. 2, and a retracted configuration, as shown in FIG. 3, to accommodate each occupant and maximize comfort for each occupant;

FIG. 5 is a chart of the ratios associated with a situation where retraction of the movable portion of the seat pad is desired;

FIG. 6 is a chart of the ratios associated with a situation where the vehicle seat is arranged in the comfort configuration; and FIG. 7 is a chart of the ratios associated with a situation where extension of the movable portion of the seat pad is desired;

FIG. 8 is a sectional view of the occupant-support base arranged in the extended configuration and suggesting that the pad-extension system is configured to retract the movable portion of the seat pad to the comfort configuration based on the position of the occupant relative to the seat pad as determined by the sensor unit;

Figure 8:
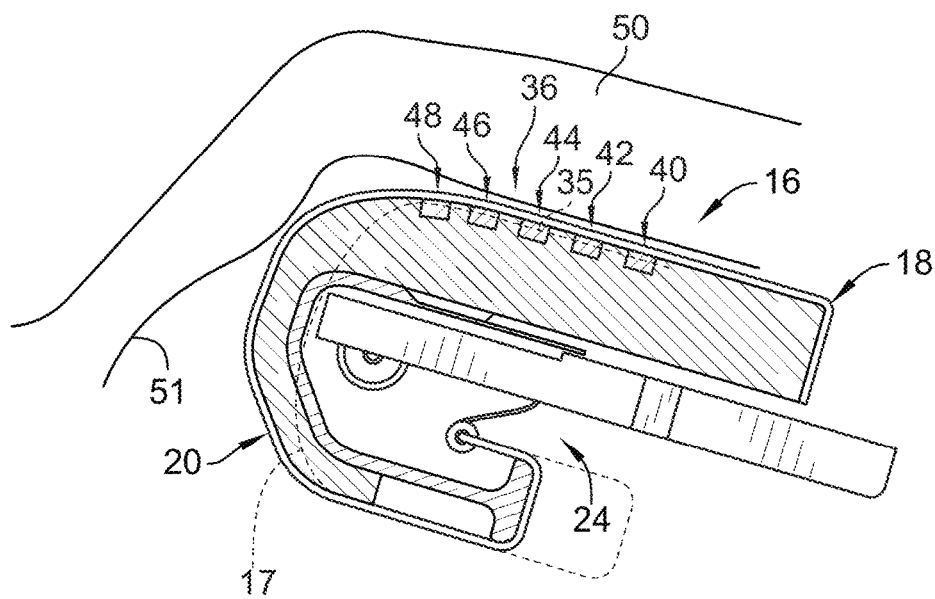
FIGS. 8-10 are as series of sectional views of the occupant-support base showing that the pad-extension system is configured to extend or retract the movable portion of the seat pad toward a comfort configuration based on the position of the occupant relative to the seat pad determined by the sensor unit.
Figure 9:
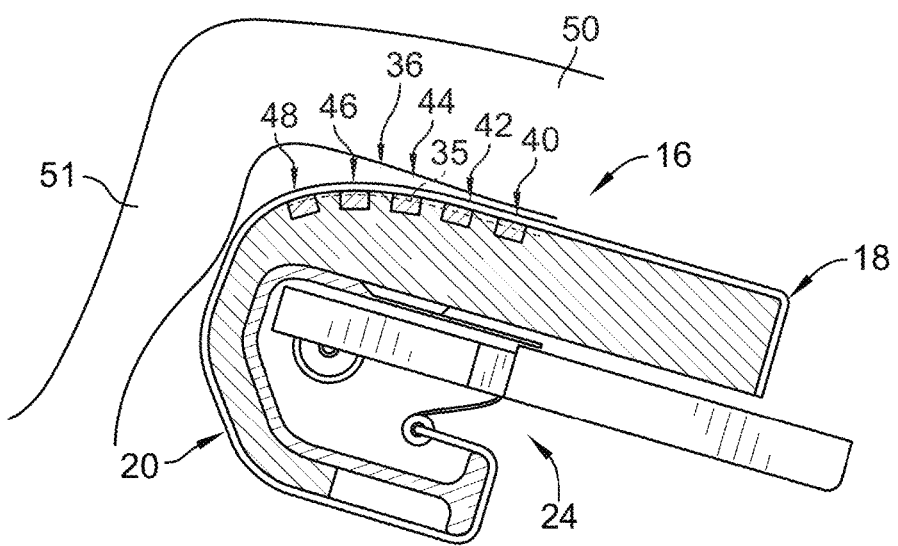
Figure 10:
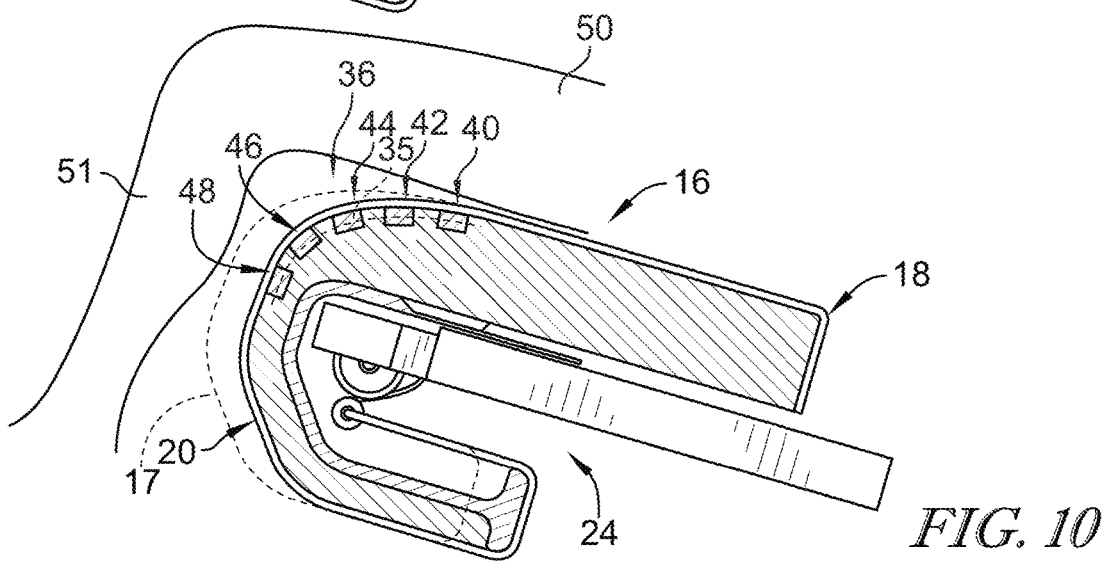

FIG. 9 is a view similar to FIG. 8 of the occupant-support base arranged in the comfort configuration; and FIG. 10 is a sectional view of the occupant-support base arranged in the retracted configuration and suggesting that the pad-extension system is configured to extend the movable portion of the seat pad to the comfort configuration based on the position of the occupant relative to the seat pad as determined by the sensor unit.

DETAILED DESCRIPTION

Figure 1:
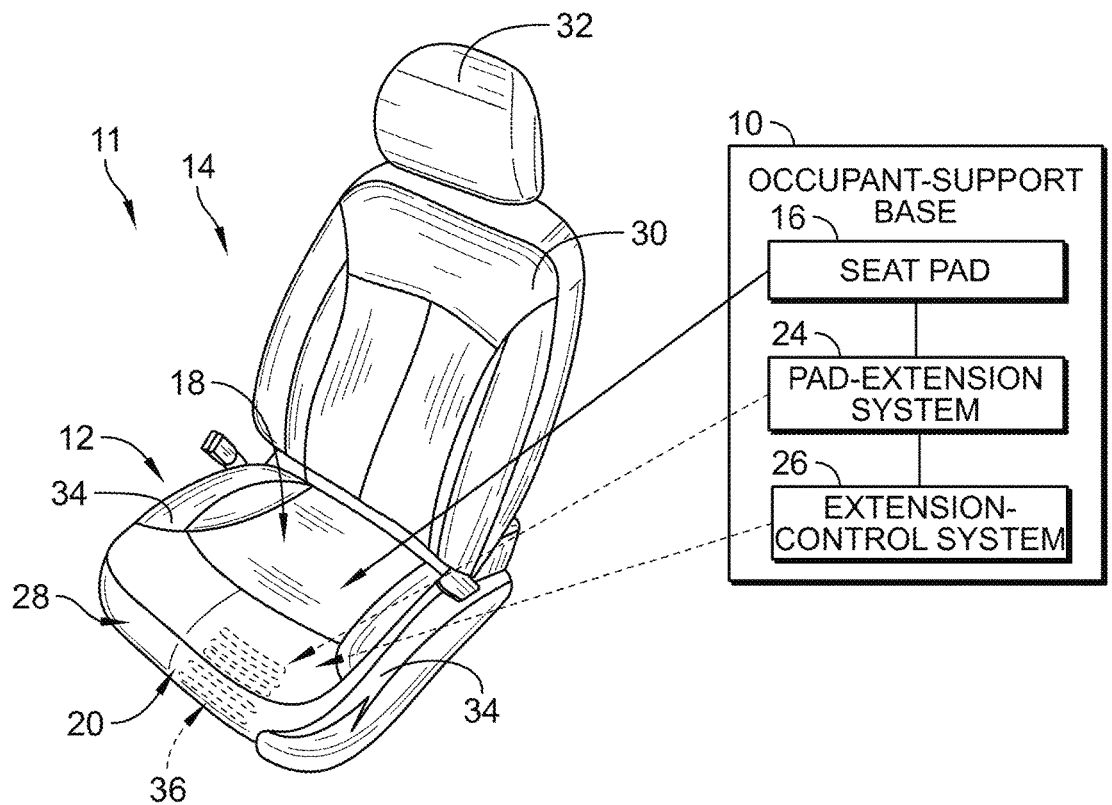
Figures 2, 3:
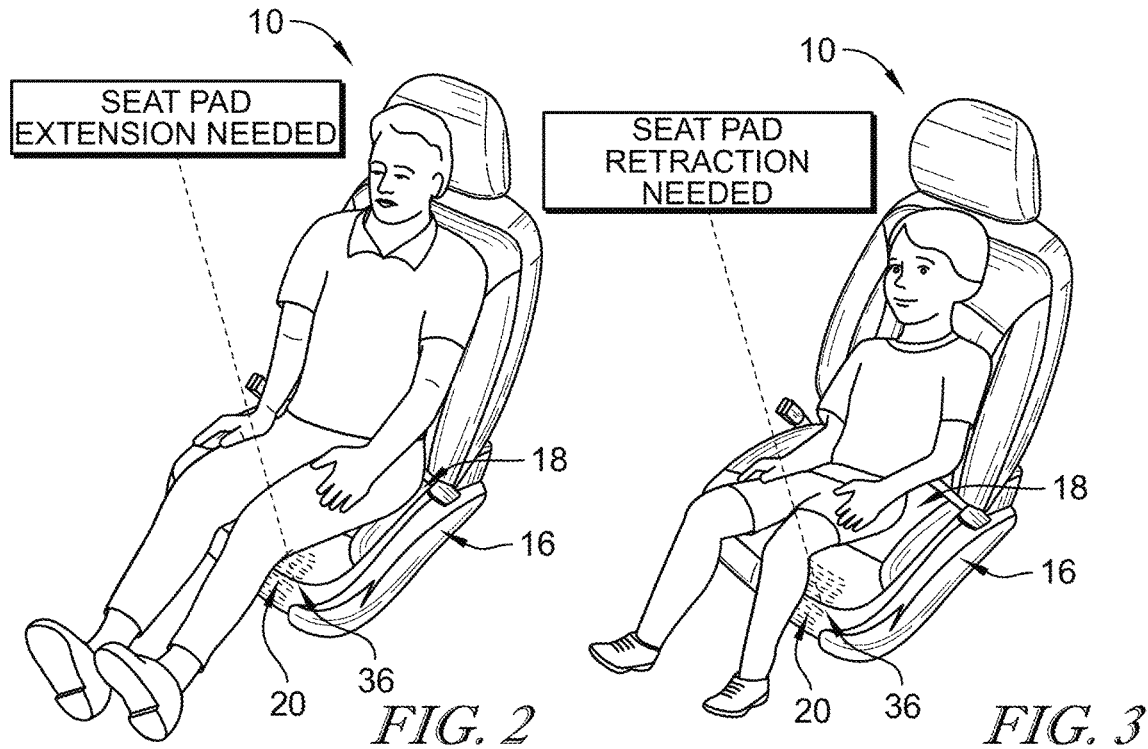
FIG. 2 is a perspective view of the occupant-support base of FIG. 1 with a generally large occupant seated thereon suggesting that extension may be needed to support the generally large occupant.
FIG. 3 is a perspective view of the occupant-support base of FIG. 1 with a generally small occupant seated thereon suggesting that retraction may be needed to support the generally small occupant.

An occupant-support base 10, in accordance with the present disclosure, is shown in FIGS. 1-3. The occupant-support base 10 includes a seat pad 16 arranged to support an occupant thereon, a pad-extension system 24 coupled to the seat pad 16, and an extension control system 26. The seat pad 16 has a movable portion 20 that is configured to extend and retract to fit occupants of different sizes. The pad-extension system 24 is configured to cause the movable portion 20 to extend or retract as suggested in FIGS. 8-10. The extension-control system 26 includes a sensor unit 36 coupled to the seat pad 16 and a controller 38 coupled to the sensor unit 36. The sensor unit 36 is configured to send sensor signals to the controller 38 and the controller is configured to send a command signal to the pad-extension system 24 to cause the pad-extension system 24 to extend or retract the movable portion 20 of the seat pad 16.

The occupant-support base 10 is illustratively embodied as a vehicle seat 11 that includes a seat bottom 12 and a seat back 14. Different sections or portions of the occupant-support base 10 may be adjusted to accommodate occupants of different sizes. Reference is hereby made to U.S. Patent Publication No. 2016/0137104 and U.S. Patent Publication No. 2016/0227932 for disclosure relating to examples of different sections of an occupant-support base which may be adjustable relative to the size of an occupant, and each application is hereby incorporated in its entirety herein.

The occupant-support base 10 includes the seat pad 16 that has a generally fixed portion 18 and the movable portion 20 as shown in FIG. 1. The movable portion 20 of the seat pad 16 is configured to move between an extended configuration and a retracted configuration while the fixed portion 18 remains stationary relative to the rest of the occupant-support base 10 as suggested in FIGS. 2 and 3. In this way, the seat pad 16 defines an occupant-support surface 22 that is configured to expand or retract to fit occupants of different sizes. For example, the seat pad 16 may need to be extended to fit a larger occupant, as suggested in FIG. 2, such that the seat pad includes an occupant-support surface with a first length. The seat pad 16 may need to be retracted to fit a smaller occupant, as suggested in FIG. 3, such that the seat pad includes an occupant-support surface with a second length that is smaller than the first length.

The occupant-support base 10 further includes the pad-extension system 24 and the extension-control system 26, as shown in FIG. 1, that cooperate to move automatically the movable portion 20 of the occupant support base 10 between the extended configuration and a retracted configuration depending on the size of the occupant seated on the occupant-support base 10. The pad-extension system 24 is configured to move the movable portion 20 of the seat pad 16 between the extended configuration and the retracted configuration based on command signals sent by the extension-control system 26. The extension-control system 26 is coupled to the pad-extension system 24 and is configured to sense a position of the occupant relative to the seat pad 16 and send a command signal 27 to the pad-extension system 24 to cause the pad-extension system 24 to move the movable portion 20 of the pad 16 based on the position of the occupant relative to the seat pad 16. The position of the occupant is associated with a size of the occupant such as, for example, a length or width of the occupant's legs or other body parts.

The pad-extension system 24 is illustratively embodied as a cushion-length adjuster for the seat bottom 12 of the vehicle seat 11, as shown in FIGS. 1-3. In the illustrative example, the movable portion 20 of the seat pad 16 is a distal end 28 of the seat bottom 12 relative to the seat back 14 and the pad-extension system 24 is configured to move the distal end 28 inward and outward relative to the seat back 14. However, in other examples, the pad-extension system 24 may be used to move other parts of the vehicle seat 11, such as, a backrest 30, a headrest 32, or side bolsters 34 as shown in FIG. 1.

Figure 4:
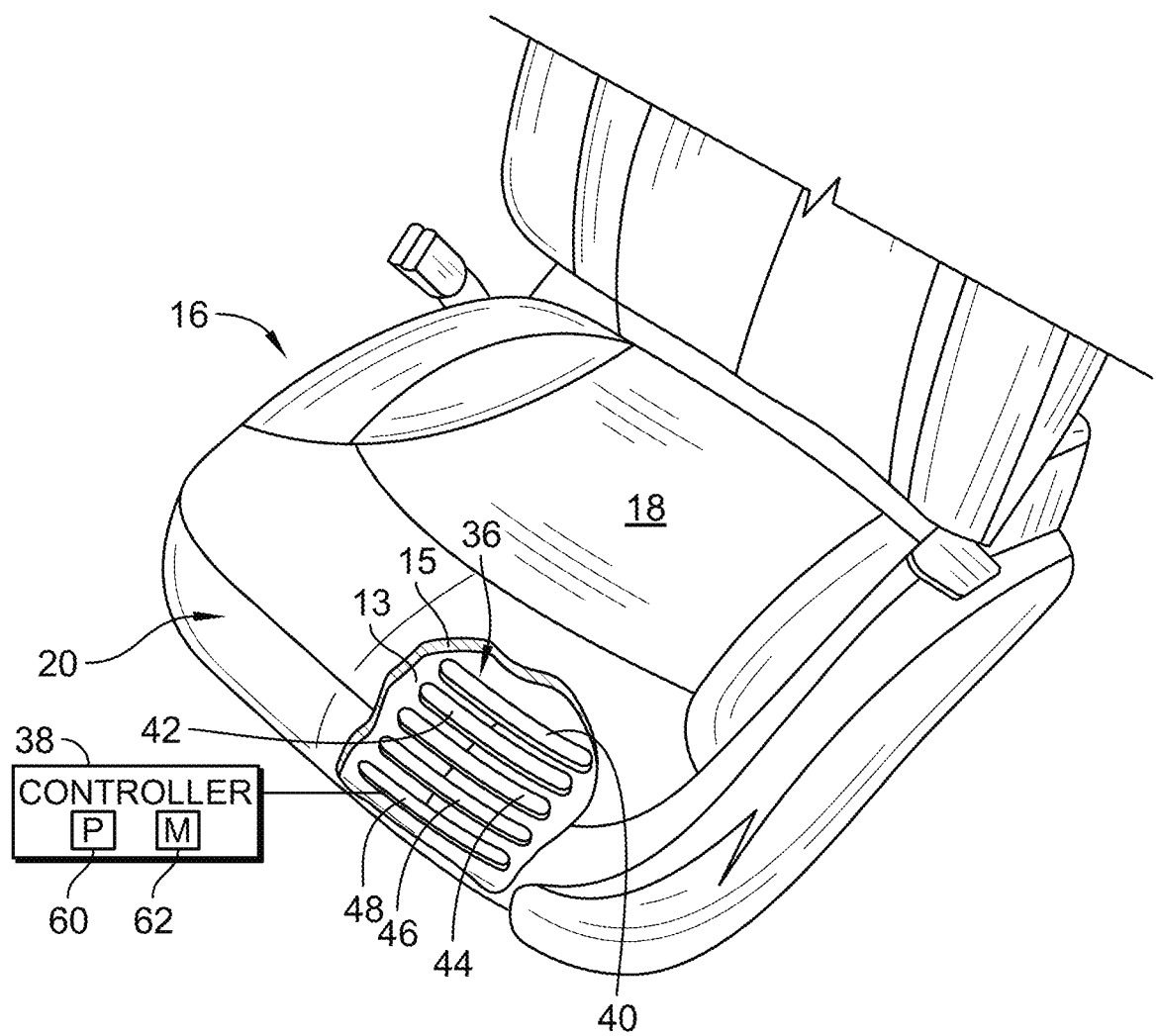
FIG. 4 is a perspective view of the seat pad with a portion removed to show the sensor unit and showing that the sensor unit includes five capacitive sensors spaced apart from one another such that the sensors define a curvature that extends along an outer surface of the seat pad.

The extension-control system 26 is incorporated in to the seat pad 16 and includes the sensor unit 36 and the controller 38 as shown in FIG. 4. The sensor unit 36 is configured to determine the position of the occupant relative to the seat pad 16 and to provide a plurality of sensor signals to the controller 38 based on the position of the occupant relative to the seat pad 16. The controller 38 is configured to receive the sensor signals and send command signals to the pad-extension system 24 based on the sensor signals provided by the sensor unit 36. The command signals sent by the controller 38 instruct the pad-extension system 24 to extend or retract the movable portion 20 of the seat pad 16 based on the position of the occupant relative to the sensor unit 36. As such, the extension-control system 26 adjusts automatically the occupant-support base 10.

The sensor unit 36 is coupled to the seat pad 16 between a seat cushion 13 and a seat trim 15 as shown in FIG. 4. In the illustrative embodiment, the sensor unit includes a first sensor 40, a second sensor 42, a third sensor 44, a fourth sensor 46, and a fifth sensor 48 that are spaced apart from one another in series along the seat pad 16. In other embodiments, any suitable number of sensors may be used. In one example, the sensors are spaced apart about equally from one another, however, any suitable spacing may be used.

In one example, the sensors 40, 42, 44, 46, 48 are located on the movable portion 20 of the seat pad 16. In another example, the sensors 40, 42, 44, 46, 48 are located on both the movable portion 20 of the seat pad 16 and the fixed portion of the seat pad 16. In yet another example, the first and second sensors 40, 42 are located on the fixed portion 18 of the seat pad 16, the fourth and fifth sensors 46, 48 are located on the movable portion 20 of the seat pad 16 and the third sensor 46 is located between the movable portion 20 and the fixed portion 18.

In the illustrative example, each of the sensors 40, 42, 44, 46, 48 is a capacitive sensor and is configured to send a sensor signal to the controller 38 representative of a capacitive value for each sensor. The capacitive value of each sensor 40, 42, 44, 46, 48 is associated with the position of the occupant relative to each sensor and/or an amount of force applied on each sensor by the occupant. Generally, each capacitive value increases or decreases in proportion to occupant proximity to each sensor and increases or decreases in proportion to a force applied on each sensor by the occupant. In another example, the sensor unit 36 may include resistive sensors. In yet another example, the sensor unit 36 may include optical sensors. In still yet another example, the sensor array 18 may include combinations of the sensors mentioned above or any other suitable alternative.

The sensors 40, 42, 44, 46, 48 define a curvature 35 as they extend in series along the seat pad 16 as shown in FIGS. 8-10. The arrangement of the sensors 40, 42, 44, 46, 48 along the curvature 35 causes each of the sensors 40, 42, 44, 46, 48 to associate with the occupant differently. That is, each sensor 40, 42, 44, 46, 48 is configured to send a sensor signal to the controller 38 representative of a different value because each sensor engages the occupant at different points along the occupants body due to the curvature 35. In one example, the sensors 40, 42, 44, 46, 48 are positioned on seat bottom 12 to sense the occupants hamstring, knee, and calf relative to the curvature 35 defined by the sensors 40, 42, 44, 46, 48. In other examples, the sensors 40, 42, 44, 46, 48 may be positioned along the backrest 30, the headrest 32, the side bolsters 34, or another part of the vehicle seat 11. In another example, the extension control system 26 is configured to determine the slope of the curvature 35 relative to the occupant's position and/or size and send a command signal to the pad-extension system 24 to adjust automatically the movable portion 20 to fit the occupant.

Figure 5:
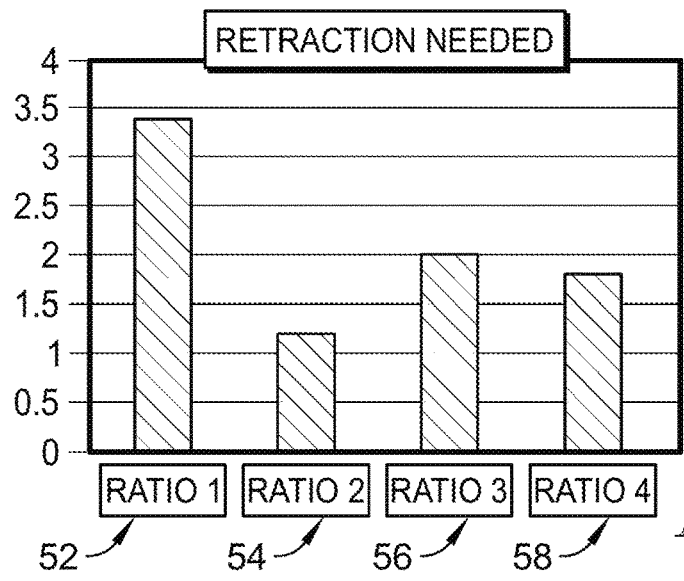
FIGS. 5-7 are a series of charts showing a first ratio, a second ratio, a third ratio, and a fourth ratio, representing various positions of the occupant relative to the seat pad.
Figure 6:
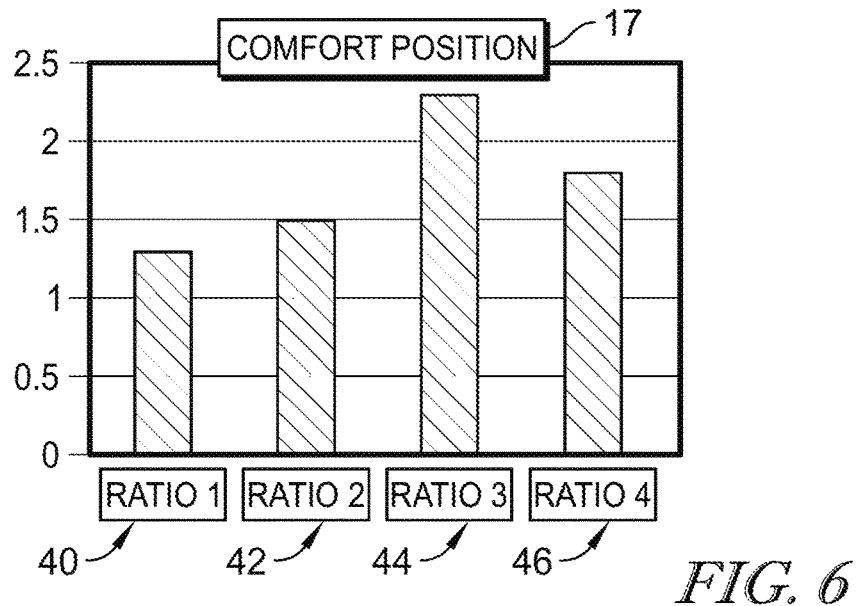
Figure 7:
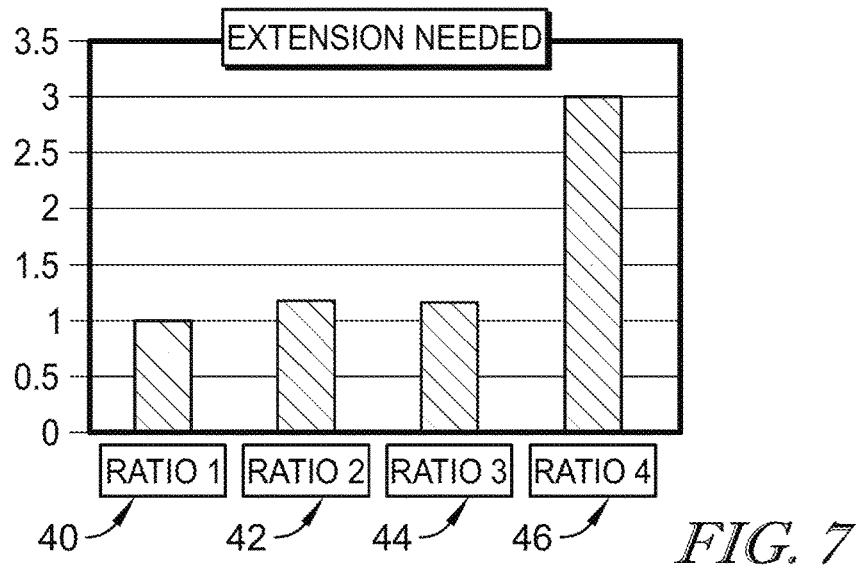

The controller 38 is configured to compare the sensor signals provided by sensors 40, 42, 44, 46, 48 and calculate a first ratio 52, a second ratio 54, a third ratio 56, and a fourth ratio 58 as shown in FIGS. 5-7. The calculation and use of ratios 52, 54, 56, 58 maps the size of the occupant to the sensors 40, 42, 44, 46, 48 and allows the seat pad 16 to fit a wider range of occupant sizes. As a result, comfort is increased and ease of adjustment is increased for a larger number of occupants.

The first ratio 52 is defined as the value of the first sensor 40 over the value of the second sensor 42. The second ratio 54 is defined as the value of the second sensor 42 over the value of the third sensor 44. The third ratio 56 is defined as the value of the third sensor 44 over the value of the fourth sensor 46. The fourth ratio 58 is defined as the value of the fourth sensor 46 over the value of the fifth sensor 48. When an occupant is not seated on the occupant-support base 10, each ratio 52, 54, 56, and 58 is about equal to about 1. When an occupant is seated on the occupant-support base 10, each ratio 52, 54, 56, and 58 varies depending on the position of the occupant relative to each sensor 40, 42, 44, 46, and 48 and, therefore, seat pad 16.

The controller 38 is configured to calculate the ratios 52, 54, 56, 58 and send a command signal to the pad-extension system 24 to extend or retract the movable portion 20 of the seat pad 16 as suggested in FIGS. 5-7. The controller 38 includes a processor 60 and memory 62. The memory 62 is programmed with predetermined conditions. The processor 60 is configured to calculate the ratios 52, 54, 56, 58 and compare the ratios 52, 54, 56, 58 to the predetermined conditions stored in memory 62 to determine what type of command signal to send to the pad-extension system 24. For example, if the first ratio 52 is less than the fourth ratio 58 plus a pre-determined value of about 0.5, the controller 38 sends a command signal to the pad-extension system 24 to extend the movable portion 20 of the seat pad 16. If the first ratio 52 is greater than the second ratio 54 plus a predetermined value of about 0.9, the controller 38 sends a command signal the pad-extension system 24 to retract the movable portion 20 of the seat pad 16.

Some examples of the situations described above are shown in the charts shown in FIGS. 5-7. As shown in FIG. 5 via arbitrary values, the first ratio 52 is greater than the second ratio 54 (predetermined value of 0.9 has already been added) triggering the controller 38 to send a command signal to the pad-extension system 24 to retract the movable portion 20 of the seat pad 16. As shown in FIG. 7 via arbitrary values, the first ratio 52 is less than the fourth ratio 58 (predetermined value of 0.5 has already been added) triggering the controller 38 to send a command signal to the pad-extension system 24 to extend the movable portion 20 of the seat pad 16.

The controller 38 is configured to stop extending or retracting the movable portion 20 of the seat pad 16 when the occupant-support base 10 reaches a comfort configuration 17 as suggested in FIG. 9. In one example, the comfort configuration 17 is defined by the following conditions: the first ratio 40 is less than the second ratio 42 plus a predetermined value of about 0.7; the second ratio 42 is less than the third ratio 44; and the third ratio 44 is greater than the fourth ratio 46. An example of this situation, using arbitrary numbers, is shown by the chart in FIG. 6. The comfort configuration 17 may also be defined as the occupant's calf being spaced apart from the movable portion 20 of the seat pad 16 by about 2 inches. However, the comfort configuration 17 may be any suitable position of the occupant relative to the occupant-support base 10.

An example of an occupant with an arbitrary thigh region 50 and a calf region 51 is shown in FIGS. 8-10. The curvature 35 defined by the sensors 40, 42, 44, 46, 48 is configured to increase or decrease slope depending on the size of the occupant's thigh region 50 and calf region 51 relative to the seat pad 16. As shown in FIG. 8, the curvature 35 has a relatively flat slope. The occupant is seated on the seat pad 16 above the sensor unit 38 such that the occupant's thigh region 50 is distributed across each of the sensors 40, 42, 44, 46, 48. Additionally, the occupant's calf region 51 is engaging the sensor unit 36. Due to the position of the occupant's thigh region 50 and calf region 51 relative to sensor unit 36, ratios 52, 54, 56, and 58 may have values similar to the values shown in the chart in FIG. 5. As such, the extension-control unit 26 may send a command signal to the pad-extension system 24 to retract the movable portion 20 of the seat pad 16. The extension-control system 26 is configured to stop retracting the movable portion 20 of the seat pad 16 once the predetermined conditions for the comfort configuration 17 is met as suggested in FIGS. 6 and 9.

As shown in FIG. 10, the curvature 35 defined by the sensors 40, 42, 44, 46, 48 has a slope greater than the slope of the curvature 35 in FIG. 8. The occupant is seated on the seat pad 16 above the sensor unit 38 such that the occupant's thigh region 50 is distributed across at least some of the sensors 40, 42, 44, 46, 48. Additionally, the occupant's calf region 51 is disengaged from the sensor unit 36. Due to the position of the occupant's thigh region 50 and calf region 51 relative to sensor unit 36, ratios 52, 54, 56, and 58 may have values similar to the values shown in the chart in FIG. 7. As such, the extension-control unit 26 may send a command signal to the pad-extension system 24 to extend the movable portion 20 of the seat pad 16. The extension-control system 26 is configured to stop extending the movable portion 20 of the seat pad 16 once the predetermined conditions for the comfort configuration 17 is met as suggested in FIGS. 6 and 9.

In one example, the pad-extension system 24 includes a pneumatic or hydraulic actuator. In another example, the pad-extension system 24 may be a pneumatic bladder or combination of pneumatic bladders. In another example, the pad-extension system 24 includes mechanical actuator. In yet another example, the pad-extension system 24 includes any suitable actuator to extend or retract different parts of the occupant-support base 10.

The invention claimed is:

1. An occupant-support base comprising:
a seat pad configured to support an occupant above a seat frame, the seat pad including a generally fixed portion fixed in position relative to the seat frame and a movable portion movable relative to the seat frame,
a pad-extension system configured to move the movable portion of the seat pad relative to the seat frame between a retracted configuration in which the seat pad defines an occupant-support surface with a first length and an extended configuration in which the seat pad defines an occupant support surface with a second length that is greater than the first length, and
an extension-control system coupled to the pad-extension system and configured to sense a position of the occupant relative to the seat pad and send a command signal to cause the pad-extension system to move the movable portion of the pad based on the position of the occupant relative to the seat pad;

wherein the extension-control system includes a sensor unit configured to provide a plurality of sensor signals associated with the position of the occupant relative to the seat pad and a controller configured to receive the sensor signals, compare the sensor signals, and send the command signal to the pad-extension system using the compared sensor signals; and wherein the sensor unit includes a plurality of sensors arranged along a curvature of the seat pad that extends from the generally fixed portion of the seat pad along the movable portion of the seat pad.

2. The occupant-support base of claim 1, wherein the plurality of sensors includes a first sensor configured to determine a first value, a second sensor configured to determine a second value, a third sensor configured to determine a third value, a fourth sensor configured to determine a fourth value, and a fifth sensor configured to determine a fifth value.

3. The occupant-support base of claim 2, wherein the controller is configured to calculate a first ratio based on the first and second values, a second ratio based on the second and third values, a third ratio based on the third and fourth values, and a fourth ratio based on the fourth and fifth values.

4. The occupant-support base of claim 3, wherein the controller is configured to send the command signal to cause the pan-extension system to extend the movable portion of the seat pad when the first ratio is less than the fourth ratio plus a predetermined value of about 0.5.

5. The occupant-support base of claim 3, wherein the controller is configured to send the command signal to cause the pan-extension system to retract the movable portion of the seat pad when the first ratio is less than the second ratio plus a predetermined value of about 0.9.

6. The occupant-support base of claim 3, wherein the controller is configured to send the command signal to the pan-extension system to cause the pan-extension system to move the movable portion of the seat pad until:

(a) the first ratio is less than the second ratio, plus a predetermined value of about 0.7;

(b) the second ratio is less than the third ratio; and (c) the third ratio is greater than the fourth ratio.

7. The occupant-support base of claim 1, wherein the plurality of sensors includes a first sensor, second sensor, third sensor, fourth sensor, and fifth sensor, and the first and second sensors are positioned on the movable portion of the seat pad, the third sensor is positioned between the movable portion of the seat pad and the generally fixed portion of the seat pad, and the fourth and fifth sensors are positioned on the generally fixed portion of the seat pad.

8. The occupant-support base of claim 7, wherein the first sensor is positioned adjacent to the second sensor and is configured to determine a first value and the second sensor is configured to determine a second value and the controller is configured to calculate a first ratio based on the first and second values.

9. The occupant-support base of claim 8, wherein the second sensor is positioned between the first sensor and the third sensor and the third sensor is configured to determine a third value and the controller is configured to calculate a second ratio based on the second and third values.

10. The occupant-support base of claim 9, wherein the third sensor is positioned between the second sensor and the fourth sensor and the fourth sensor is configured to determine a fourth value and the controller is configured to calculate a third ratio based on the third and fourth values.

11. The occupant-support base of claim 10, wherein the fourth sensor is positioned between the third sensor and the fifth sensor and the fifth sensor is configured to determine a fifth value and the controller is configured to calculate a fourth ratio based on the fourth and fifth values.

12. The occupant-support base of claim 1, wherein the plurality of sensors includes a first sensor, a second sensor, a third sensor, a fourth sensor, and a fifth sensor coupled to the movable portion of the seat pad in spaced-apart relation to one another.

13. The occupant-support base of claim 12, wherein the first sensor is positioned adjacent to the second sensor and is configured to determine a first value and the second sensor is configured to determine a second value and the controller is configured to calculate a first ratio based on the first and second values.

14. The occupant-support base of claim 13, wherein the second sensor is positioned between the first sensor and the third sensor and the third sensor is configured to determine a third value and the controller is configured to calculate a second ratio based on the second and third values.

15. The occupant-support base of claim 14, wherein the third sensor is positioned between the second sensor and the fourth sensor and the fourth sensor is configured to determine a fourth value and the controller is configured to calculate a third ratio based on the third and fourth values.

16. The occupant-support base of claim 15, wherein the fourth sensor is positioned between the third sensor and the fifth sensor and the fifth sensor is configured to determine a fifth value and the controller is configured to calculate a fourth ratio based on the fourth and fifth values.

17. The occupant-support base of claim 1, wherein the plurality of sensors includes a first sensor configured to determine a first value, a second sensor configured to determine a second value, and a third sensor configured to determine a third value, the controller is configured to calculate a first ratio based on the first and second values and a second ratio based on the second and third ratios, and the controller is configured to send the command signal to cause the pad-extension system to extend the movable portion of the seat pad when the first ratio is less than the second ratio plus a predetermined value.

18. The occupant-support base of claim 1, wherein the pad-extension system is a cushion-length adjuster for a headrest.

* * * * *